(12) United States Patent
Prinyawiwatkul et al.

(10) Patent No.: US 11,634,561 B2
(45) Date of Patent: Apr. 25, 2023

(54) WATER-SOLUBLE, HIGH-MOLECULAR-WEIGHT CHITOSAN POWDERS

(71) Applicants: Witoon Prinyawiwatkul, Baton Rouge, LA (US); Zhimin Xu, Baton Rouge, LA (US); Yixiao Shen, Phoenixville, PA (US)

(72) Inventors: Witoon Prinyawiwatkul, Baton Rouge, LA (US); Zhimin Xu, Baton Rouge, LA (US); Yixiao Shen, Phoenixville, PA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 730 days.

(21) Appl. No.: 15/776,168

(22) PCT Filed: Nov. 14, 2016

(86) PCT No.: PCT/US2016/061820
§ 371 (c)(1),
(2) Date: May 15, 2018

(87) PCT Pub. No.: WO2017/087317
PCT Pub. Date: May 26, 2017

(65) Prior Publication Data
US 2020/0255631 A1     Aug. 13, 2020

Related U.S. Application Data

(60) Provisional application No. 62/255,697, filed on Nov. 16, 2015.

(51) Int. Cl.
*C08L 5/08* (2006.01)
*C08J 3/075* (2006.01)
*C08K 5/17* (2006.01)

(52) U.S. Cl.
CPC .............. *C08L 5/08* (2013.01); *C08J 3/075* (2013.01); *C08K 5/175* (2013.01); *C08J 2305/08* (2013.01); *C08L 2201/54* (2013.01)

(58) Field of Classification Search
CPC .......... C08L 5/08; C08L 2201/54; C08J 3/075
See application file for complete search history.

(56) References Cited

U.S. PATENT DOCUMENTS

| | | | |
|---|---|---|---|
| 4,964,894 A * | 10/1990 | Freepons | A01N 43/16 47/57.6 |
| 6,167,652 B1 | 1/2001 | Heinsohn et al. | |
| 6,190,694 B1 * | 2/2001 | Mizushima | A61P 7/00 424/451 |
| 2008/0200430 A1 | 8/2008 | Sitterman et al. | |
| 2015/0216894 A1 | 8/2015 | McCarthy et al. | |

OTHER PUBLICATIONS

Orienti (International Journal of Pharmaceutics 238 (2002) 51-59).*
Orienti, I. et al., "Influence of Different Chitosan Salts on the Release of Sodium Diclofenac in Colon-Specific Delivery," International Journal of Pharmaceutics, vol. 238, pp. 51-59 (2002).
Huanbutta, K. et al., "Impact of Salt Form and Molecular Weight of Chitosan on Swelling and Drug Release From Chitosan Matrix Tablets," Carbohydrate Polymers, vol. 97, pp. 26-33 (2013).
El-Hefian, E. et al., "Study of the Parameters Affecting the Viscosity of Chitosan Solutions," Journal Chem. Soc. Pakistan, vol. 30, pp. 529-531 (2008).
Ahmed, S. et al., "Chitosan: A Natural Antimicrobial Agent—A Review," Journal of Applicable Chemistry, vol. 3, pp. 493-503 (2014).
Alves, N.M. et al., "Chitosan Derivatives Obtained by Chemical Modifications for Biomedical and Environmental Applications," International Journal of Biological Macromolecules, vol. 43(5), pp. 401-414 (2008).
Hwang, K. et al., "Controlling Molecular Weight and Degree of Deacetylation of Chitosan by Response Surface Methodology," Journal of Agricultural and Food Chemistry, vol. 50, No. 7, pp. 1876-1882 (2002).
Ikeda, I. et al., "Effects of Chitosan Hydrolysates on Lipid Absorption and on Serum and Liver Lipid Concentration in Rats," Journal of Agricultural and Food Chemistry, vol. 41, No. 3, pp. 431-435 (1993).
No, H. K. et al., "Stability and Antibacterial Activity of Chitosan Solutions Affected by Storage Temperature and Time," Carbohydrate Polymers, vol. 65, No. 2, pp. 174-178 (2006).
No, H. K. et al., "Application of Chitosan for Treatment of Wastewaters," Rev Environ Contam Toxicol, vol. 163, pp. 1-28 (2000).
No, H. K. et al., "Application of Chitosan for Improvement of Quality and Shelf Life of Foods: A Review," Journal of Food Science, vol. 72, No. 5, pp. R87-R100 (2007).
Sun, Y. et al., "The Effect of Chitosan Molecular Weight on the Characteristics of Spray-Dried Methotrexate-Loaded Chitosan Microspheres for Nasal Administration," Drug Dev Ind Pharm, vol. 35, No. 3, pp. 379-386 (2009).
Tokura, S. et al., "Molecular Weight Dependent Antimicrobial Activity by Chitosan," Macromolecular Symposia, vol. 120, No. 1, pp. 1-9 (1997).
Wang, J. et al., "Synthesis and Characterization of a Novel Cationic Chitosan-Based Flocculant with a High Water-Solubility for Pulp Mill Wastewater Treatment," Water Research, vol. 43, No. 20, pp. 5267-5275 (2009).
Zhang, D. et al., "Effects of Chitosan Coating on Enzymatic Browning and Decay During Postharvest Storage of Litchi (*Litchi chinensis* Sonn.) Fruit," Postharvest Biology and Technology, vol. 12, pp. 195-202 (1997).

(Continued)

*Primary Examiner* — Pancham Bakshi
(74) *Attorney, Agent, or Firm* — John H. Runnels

(57) ABSTRACT

The poor water solubility of high molecular weight chitosan has limited its use in areas such as food and beverage products, post-harvest treatments, cosmetic and pharmaceutical products, medical treatments, and environmental pollution treatments. Disclosed is a high-molecular-weight, solid-state chitosan powder that is completely water-soluble.

19 Claims, No Drawings

(56) References Cited

OTHER PUBLICATIONS

Nadarajah, K. et al., "Sorption Behavior of Crawfish Chitosan Films as Affected by Chitosan Extraction Processes and Solvent Types," Journal of Food Science, vol. 71, No. 2, pp. E33-E39 (2006).

Shelma et al., "Submicroparticles Composed of Amphiphilic Chitosan Derivative for Oral Insulin and Curcumin Release Applications" Colloids Surf B Biointerfaces, vol. 88 No. 2. pp 722-728 (2011).

S. Nimesh, "Chitosan nanoparticles," pp. 163-196 in *Gene Therapy. Potential Applications of Nanotechnology* (doi:10.1533/9781908818645. 163) p. 165 (2013).

Carneiro, J., Tedim, J., & Ferreira, M. G. S. (2015). Chitosan as a smart coating for corrosion protection of aluminum alloy 2024: A review. Progress in Organic Coatings. In Press. doi:10.1016/j.porgcoat.2015.03.008.

Dai, T., Tanaka, M., Huang, Y.-Y., & Hamblin, M.R. (2011) Chitosan preparations for wounds and burns: antimicrobial and wound-healing effects. Expert review of anti-infective therapy, 9(7), 857-879.

Elgadir, M. A., Uddin, M. S., Ferdosh, S., Adam, A., Chowdhury, A. J. K., & Sarker, M. Z. I. (2014). Impact of chitosan composites and chitosan nanoparticle composites on various drug delivery systems: A review. Journal of Food and Drug Analysis. In Press. doi:10.1016/j.jfda.2014.10.008.

Rinaudo, M. (2006). Chitin and chitosan: Properties and applications. Progress in Polymer Science, 31(7), 603-632.

Yau, W. W., Malone, C.P., & Suchan, H.L. (1970). Separation Mechanisms in Gel Permeation Chromatography. Separation Sciense, 5(3), 259-271.

Zou, P., Yang, X., Wang, J., Li, Y., Yu, H., Zhang, Y., & Liu, G. (2016). Advances in characterisation and biological activities of chitosan and chitosan oligosaccharides. Food Chemistry, 190, 1174-1181.

* cited by examiner

WATER-SOLUBLE, HIGH-MOLECULAR-WEIGHT CHITOSAN POWDERS

This is the United States national stage of international application PCT/US2016/061820, international filing date Nov. 14, 2016, which claims the benefit of the Nov. 16, 2015 filing date of U.S. provisional patent application 62/255,697 is claimed under 35 U.S.C. § 119(e).

TECHNICAL FIELD

This invention pertains to water-soluble, high-molecular-weight chitosan powders.

BACKGROUND ART

Chitosan is a polymer derived by deacetylation of chitin [poly-$\beta$-(1$\rightarrow$4)-N-acetyl-D-glucosamine]. The carbohydrate chitin is produced by various taxa. Chitin is a major component of the exoskeleton ("shells") of crustaceans such as crab, shrimp, lobster, and crawfish. Chitin is the second most abundant natural biopolymer, after cellulose. The enormous amount of crustacean shell waste from seafood processing could potentially be used for producing valuable chitosan, which could help reduce costs for handling shell waste and could also help reduce environmental pollution. Traditionally, chitin has been produced by chemical processing of crustacean shells, with separate steps for deproteinization, demineralization, and decoloration. Chitosan can then be derived from chitin by partial or complete alkaline deacetylation or enzymatic deacetylation of chitin.

Chitosan is biocompatible, nonantigenic, nontoxic, and biofunctional. Chitosan has many uses. Its antimicrobial activity against a range of foodborne fungi, yeast, and bacteria makes it useful as a food preservative. Its functional properties include water and fat uptake, emulsification, dye-binding, gelation, and film-formation. Chitosan can be processed into an edible film to reduce moisture loss or weight loss during postharvest storage of food, and to inhibit the growth of microorganisms on food. It can be used as a thickener and a stabilizer for various sauces, and as a clarifying agent for beverages. For environmental protection, chitosan can coagulate organic compounds, chelate toxic heavy metals, remove odors, adsorb dyes, and adsorb polychlorinated biphenyls—for example from industrial wastewater. Cosmetics applications include uses in toning skin, and improving the suppleness of and reducing static electricity in hair. Chitosan has important biopharmaceutical uses. Chitosan is used for wound and burn healing due to its hemostatic properties, its stimulation of healing, its antimicrobial properties, its nontoxicity to vertebrates, its biocompatibility, and its biodegradability. Chitosan can also be used as a carrier to deliver other therapeutic agents to wounds or burns. Chitosan-based drug delivery systems have been developed as hydrogels and nanoparticles, e.g., as immunostimulants, anti-angiogenic compositions, and anti-tumor agents.

The properties of chitosan depend on its degree of polymerization (DP), its degree of deacetylation (DD), and especially its molecular weight (MW). Chitosans of different molecular weights are used for different purposes. As a nutritional supplement, chitosans with relatively low MWs (~10 kDa to ~20 kDa) may help lower plasma cholesterol and liver cholesterol by binding fats and inhibiting lipid adsorption. It has been reported that 9.3 kDa chitosan inhibits the growth of *E. coli*; that 2,250 kDa chitosan inhibits the growth of *L. monocytogenes*; and that 1,110 kDa chitosan suppresses *S. aureus* and *S. enteritidis*.

Microspheres formed from low MW chitosan (~40 kDa) have good flowability, but poor adhesion, which limits their usefulness for delivering drugs. Microspheres formed from higher MW chitosan (~850 kDa) offer better control over the release rate of a drug, which may be adjusted by altering the ratio of drug to polymer. However, chitosans with higher MW, higher DP, or lower DD tend to have lower solubilities. Low solubility limits use as a drug delivery vehicle. Prior attempts to improve the water solubility of high MW chitosan have centered primarily on chemical modifications, for example grafting, derivatizing, or crosslinking chitosan. However, such modifications typically require relatively expensive chemical reagents, some of which may not be considered safe for food, cosmetics, or pharmaceutical purposes. Another approach has been to use solutions of organic acids such as acetic, lactic, ascorbic, or citric acid to help dissolve high MW chitosan; however, the resulting pungent smell, sour taste, susceptibility to oxidation, and the lengthy preparation times have limited acceptance of these approaches. S. Nimesh, "Chitosan nanoparticles," pp. 163-196 in *Gene Therapy. Potential Applications of Nanotechnology* (2013) (doi:10.1533/9781908818645.163) said at page 165, "chitosan is readily soluble in acidic media such as acetic acid, citric acid, glutamic acid, aspartic acid, hydrochloric acid, and lactic acid, and insoluble at neutral and alkaline pH values."

The most common approach has probably been to dissolve chitosan in acetic acid. However, the resulting product has a pungent smell. A significant drawback is that once a chitosan/acetic acid solution has been dried, the resulting powder can only be partially re-dissolved in water (pH 7).

I. Orienti et al., "Influence of different chitosan salts on the release of sodium diclofenac in colon-specific delivery," *Int. J. Pharmaceut.*, vol. 238, pp. 51-59 (2002) disclosed the preparation and characteristics of various controlled-release drug-delivery compositions comprising chitosan salts, including the chitosan salts of aspartic, glutamic, hydrochloric, citric, and lactic acids. See also K. Huanbutta et al., "Impact of salt form and molecular weight of chitosan on swelling and drug release from chitosan matrix tablets," *Carbohydrate Polymers*, vol. 97, pp. 26-33 (2013).

E. El-Hefian et al., "Study of the parameters affecting the viscosity of chitosan solutions," *J. Chem. Soc. Pakistan*, vol. 30, pp. 529-531 (2008) reported that the viscosity of an organic acid-acidified chitosan solution was positively correlated with the number of carbons in the organic acid, due to chain entanglement between the acid and the macromolecule.

Ahmed, S., Ahmad, M., & Ikram, S. (2014). Chitosan: A Natural Antimicrobial Agent—A Review. *J. Applicable Chem.* 3, 493-503 is a review presenting an overview of sources, solubility, chemical properties, biological properties and mode of action of antimicrobial activities of chitosan. The authors noted: "The use of chitosan is limited because of its insolubility in water, high viscosity, and tendency to coagulate with proteins at higher pH. Many efforts have been reported to prepare functional derivatives by chemical modifications to increase the solubility in water." "Chitosan is insoluble in most of the solvents but is soluble in dilute organic acids such as acetic acid, formic acid, succinic acid, lactic acid, and malic acid below pH 6.0." "The reported antimicrobial activities of chitosan might be the effect of dissolved chitosan in acidic media such as acetic acid, lactic acid, glutamic acid and hydrochloric acid."

Alves, N. M., & Mano, J. F. (2008). Chitosan derivatives obtained by chemical modifications for biomedical and environmental applications. *Intl J. Biological Macromolecules,* 43(5), 401-414 is a review that, among other things, describes various techniques that have been used to enhance the solubility of chitosan, including derivatization with small functional groups and graft copolymerization.

El-Hefian, E. A., Khan, R. A., & Yahaya, A. H. (2008). Study of the parameters affecting the viscosity of chitosan solutions. *J. Chem. Soc. Pakistan,* 30, 529-531 described various properties of chitosan in solutions of formic, acetic, and propionic acids.

Hwang, K. T., Jung, S. T., Lee, G. D., Chinnan, M. S., Park, Y. S., & Park, H. J. (2002). Controlling molecular weight and degree of deacetylation of chitosan by response surface methodology. *J Agric Food Chem,* 50(7), 1876-1882. The authors used a chemical process to alter the molecular weight and degree of deacetylation of chitosan. Chitosan was depolymerized in a range from 100 kDa to 1100 kDa by NaOH alkaline treatment. Increasing the temperature, reaction time, and NaOH concentration was reported to decrease the molecular weight of the chitosan.

Ikeda, I., Sugano, M., Yoshida, K., Sasaki, E., Iwamoto, Y, & Hatano, K. (1993). Effects of chitosan hydrolysates on lipid absorption and on serum and liver lipid concentration in rats. *J Agric Food Chem,* 41(3), 431-435 discusses benefits that might be obtained from chitosan, such as hypocholesterolemic activity, and decreases in hepatic cholesterol and triglycerides. Enzymatic hydrolysates were used to prepare solutions of chitosan, which were administered to experimental animals.

No, H. K., Kim, S. H., Lee, S. H., Park, N. Y., & Prinyawiwatkul, W. (2006). Stability and antibacterial activity of chitosan solutions affected by storage temperature and time. *Carbohydrate Polymers,* 65(2), 174-178 reported various properties of chitosan solutions in acetic or lactic acid, including their viscosity, antibacterial properties, and their changes as a function of storage time.

No, H. K., & Meyers, S. P. (2000). Application of chitosan for treatment of wastewaters. *Rev Environ Contam Toxicol,* 163, 1-28 noted, "The solubility of chitosan in acidic media presently limits its use as an adsorbent in low-pH wastewaters. However, chemical modifications of the biopolymer, such as cross-linking with glutaraldehyde, and the synthesis of highly porous beads of chemically cross-linked chitosan, in all likelihood will overcome usage limitations by imparting increased resistance to solubilization in acidic pH effluents, thus improving overall adsorption capacity. A broad variety of modified chitosans are available commercially."

No, H. K., Meyers, S. P., Prinyawiwatkul, W., and Xu, Z. (2007). Applications of chitosan for improvement of quality and shelf life of foods: A review. *J Food Sci,* 72(5), R87-R100 reported, "Chitosan is water-insoluble but soluble in weak organic acid solutions. Chitosan derivatives in the form of acetate, ascorbate, lactate, and malate are water-soluble. Water soluble chitosan can also be produced in the form of oligosaccharide by enzymatic or chemical hydrolysis."

Sun, Y., Cui, F., Shi, K., Wang, J., Niu, M., & Ma, R. (2009). The effect of chitosan molecular weight on the characteristics of spray-dried methotrexate-loaded chitosan microspheres for nasal administration. *Drug Dev Ind Pharm,* 35(3), 379-386 reported that chitosan's biodegradability and bioadhesivity render it useful in formulations for nasal drug delivery, which need prolonged retention in the nasal cavity. They concluded that microspheres with low MW (40 kDa) chitosan were less useful in preparing mucoadhesive microspheres, while medium (480 kDa) and high (850 kDa) MW chitosan microspheres had excellent mucoadhesive properties.

Tokura, S., Ueno, K., Miyazaki, S., & Nishi, N. (1997). Molecular weight dependent antimicrobial activity by Chitosan. *Macromolecular Symposia,* 120(1), 1-9 described chitosan oligomers of average molecular weight 9,300 Da and 2,200 Da that were chemically prepared by nitrous acid degradation, followed by the reduction of the 2,5-anhydromannose terminal by sodium borohydrate. Bacterial growth inhibition was inferred to be the result of preventing delivery of nutrients through the cell wall, rather than blocking DNA transcription.

Wang, J.-P., Chen, Y-Z., Yuan, S.-J., Sheng, G.-P., & Yu, H.-Q. (2009). Synthesis and characterization of a novel cationic chitosan-based flocculant with a high water-solubility for pulp mill wastewater treatment. *Water Research,* 43(20), 5267-5275 reported that the molecular weight and water solubility of chitosan are the most significant factors in determining its effectiveness as a flocculant in wastewater treatment and sludge dewatering. High molecular weight chitosan dissolved only in acidic solution; however, at a pH lower than 5, acidic conditions could degrade chitosan and consequently reduce its flocculation efficiency. Grafting was an effective method to modify chitosan. A cationic monomer, (2-methacryloyloxyethyl) trimethyl ammonium chloride (DMC), was grafted onto chitosan, initiated by potassium persulphate. The introduction of DMC onto the chitosan backbone was reported to increase cationic content, and to improve water solubility.

Nadarajah, K., Prinyawiwatkul, W., No, H. K., Sathivel, S., & Xu, Z. (2006). Sorption behavior of crawfish chitosan films as affected by chitosan extraction processes and solvent types. *J. Food Sci.* 71(2), E33-E39 reported the preparation of various chitosans with a MW range of 454-1462 kDa, which were subsequently made into a film by dissolving in 1% (v/v) acetic acid, formic acid, lactic acid, or malic acid at 1% w/v, then pouring the solution onto a PTFE-coated plate and drying at ambient conditions. The chitosans mixed with acetic or formic acids yielded flexible films without added plasticizers, other than the acetic or formic acid itself.

Zhang, D. & Quantick, P. (1997). Effects of Chitosan Coating on Enzymatic Browning and Decay During Postharvest Storage of Litchi (*Litchi chinensis* Sonn.) Fruit. Postharvest Biology and Technology, 12, 195-202 describes effects on litchi fruit of dipping first in thiabendazole solution, and then in an aqueous solution of chitosan and glutamic acid with polysorbate 80 surfactant. Fruit were allowed to dry for one hour after dipping, and then stored at 4° C. The chitosan coating was reported to partially inhibit decay of fruit during storage.

There is an unfilled need for a solid-state, high-molecular-weight chitosan composition that is readily soluble in water.

DISCLOSURE OF INVENTION

We have discovered a solid-state, high-molecular-weight (HMW) chitosan composition that is readily soluble in water; without the need for any mineral acid, and without the need for any surfactant. In a first step, a warm, odorless, aqueous solution of aspartic acid, glutamic acid, or a mixture of aspartic and glutamic acids substantially improves the solubility of HMW chitosan without the drawbacks resulting from prior acetic acid methods or chemical modification methods. Aspartic acid and glutamic acid are both amino acids. Without wishing to be bound by this hypothesis, we believe that when HMW chitosan is dissolved in solutions of these amino acids, the chitosan amine groups are protonated, which breaks down intramolecular hydrogen bonds within chitosan, "opening up" the chitosan molecules to interactions with water molecules, thereby improving hydrophilicity and water solubility. Electrostatic interactions between the resulting polycationic HMW chitosan and the amino acid molecules then inhibit the formation of insoluble micelles.

In a second step, the chitosan/amino acid aqueous solution is dried to produce a water-soluble, solid-state, high molecular weight chitosan powder, a powder that will rapidly re-dissolve in water (initial pH 7)—e.g., typically within 15 minutes (depending on molecular weight, temperature, concentration, etc.). The powder may optionally be ground to increase its surface area and dissolution rate. By contrast, if one dries an acetic acid solution of chitosan, the resulting solid will not completely re-dissolve in water (initial pH 7).

The novel, highly water-soluble HMW chitosan powder is convenient for commercial uses in food, cosmetics, pharmaceuticals, and other applications. Existing chitosan production facilities may readily be retrofitted to produce the novel soluble chitosan powder. There is no need to employ either acetic acid, mineral acid, surfactant, or plasticizer in producing the novel soluble chitosan powder. The powdered product dissolves rapidly in water (initial pH 7). The invention allows one to produce an aqueous solution containing higher concentrations of HMW chitosan than has been possible with prior acetic acid techniques or other previous techniques The dried, solid-state salt powder may be stored until used, preferably in an air-tight container that excludes light. In one embodiment, the salt is not a coating on an agricultural product. In another embodiment, the salt is dissolved in water, which is then used to impart a chitosan coating onto an agricultural product (e.g., fruit, vegetable, grain, etc.)

As used in the specification and claims, unless context clearly indicates otherwise: A "high molecular weight" chitosan is one whose molecular weight is greater than 300 kDa; a "medium molecular weight" chitosan is one whose molecular weight is 100-300 kDa; and a "low molecular weight" chitosan is one whose molecular weight is less than 100 kDa. Although the experimental work conducted on this invention to date has centered primarily on high molecular weight chitosans, the invention will also work for medium molecular weight chitosans, which have also been difficult to solubilize; and also works for low molecular weight chitosans, which typically have a modest solubility but whose solubility can still be improved with the present invention. The average molecular weight of chitosan used in this invention can be at least 70 kDa, at least 100 kDa, at least 150 kDa, at least 200 kDa, at least 300 kDa, at least 400 kDa, at least 500 kDa, at least 600 kDa, at least 700 kDa, at least 800 kDa, at least 900 kDa, at least 1000 kDa, at least 1200 kDa, at least 1500 kDa, at least 1700 kDa, or at least 2000 kDa. The molecular weight of chitosan in certain applications can also be below 100 kDa. The average molecular weight may be assayed or determined in accordance with any means known in the art for making such measurements, including but not limited to gel permeation chromatography.

MODES FOR CARRYING OUT THE INVENTION

Example 1: Materials

Chitosan powders, MW 789 kDa and 1017 kDa (Kitto Life, Korea), were kindly provided by the Department of Food Science and Technology, Catholic University of Daegu, Korea. Acetic acid was purchased from Aldrich Chemicals (Milwaukee, Wis., U.S.A.). Aspartic acid and glutamic acid were purchased from Sigma Chemical Co. (St. Louis, Mo., U.S.A.). All reagents and chemicals were of analytical grade.

Example 2: Preparation of Solutions of Chitosan with Amino Acids or Other Acids

For each of the mixtures listed in Tables 1 & 2, the acid (viz., acetic acid, aspartic acid, glutamic acid, or combination of acids) was first dissolved in warm, distilled water (60° C.). Chitosan powder was then added to the acidic solution, which was subjected to continuous magnetic stirring. After the chitosan had dissolved, the resulting chitosan solutions were stored in screw-capped glass bottles until used or until analyzed. Solutions were dried either by air-drying a 2 mm deep solution at 25° C. in a plastic container under a fume hood, or by oven-drying at 80-90° C. On an industrial scale, spray-drying might be used instead. Dried powders were stored in a closed container at 4° C. until used. (As of the filing date of the present application, we have not measured data concerning the shelf life of these preparations.)

Example 3: Determination of Viscosity and pH

Viscosity was measured with a viscometer (model DV-I+, Brookfield Engineering Labs Inc., Middleboro, Mass., USA) at 60 rpm using a T-F spindle, with triplicate measurements. The pH values of the prepared chitosan solutions were measured with a pH meter (Accumet AP61, Fisher Scientific, Pittsburgh, Pa., USA), with triplicate measurements.

Example 4: Centrifuging and Filtering the Chitosan Solutions

Each chitosan solution was transferred into a 15 mL clean centrifuge tube, and then centrifuged at 5000 rpm for 20 min. The degree of solubilization was assessed by visual observation of any precipitated particles. To evaluate undissolved solids, a 1% chitosan solution was diluted with distilled water at a 1:2 ratio (v/v) chitosan solution:distilled water. The diluted mixture was passed through a filter paper under vacuum filtration. The filter paper with any residue was dried and weighed to calculate the residue percentage:

$$\text{Residue percentage} = \frac{\text{Weight of dried filter paper after filtration} - \text{Weight of dry filter paper before filtration}}{\text{Total weight of chitosan and amino acid added to the solution}} \times 100\%$$

Examples 5-22: Dissolution Times, and Re-Dissolution Times (after Drying) for Various Combinations of Chitosan with Aspartic Acid, Glutamic Acid, and Acetic Acid Dissolution times, and re-dissolution times (after drying) for various combinations of chitosan with aspartic acid, glutamic acid, and acetic acid are shown in Tables 1 and 2. Table 1 shows data for 789 kDa chitosan, and Table 2 shows data for 1017 kDa chitosan. The re-dissolution rates for the chitosan/amino acid combinations (after drying) were at least twice as fast as the original dissolution rates (before drying).

TABLE 1

Dissolution and re-dissolution times (minutes) for various concentrations (wt %) of chitosan (MW 789 kDa) with Aspartic Acid (Asp), Glutamic Acid (Glu), or Acetic Acid (AA)

| Chitosan concentration | Organic acid concentration (wt %) | | | Dissolution | Re-dissolution Time (min) for |
|---|---|---|---|---|---|
| (wt %) | Asp | Glu | AA | Time (min) | dried powder |
| 1 | 1 | 0 | 0 | 20 | 5 |
| 1 | 0.8 | 0 | 0 | 30 | 15 |
| 1 | 0.7 | 0 | 0 | >180 | N/A |
| 1 | 0.5 | 0 | 0 | Still had some particles | N/A |
| 1 | 0 | 1 | 0 | 35 | 15 |
| 1 | 0.4 | 0.25 | 0.25 | 30 | 8 |
| 1 | 0.5 | 0.25 | 0.25 | 25 | 5 |
| 3 | 3 | 0 | 0 | 25 (glass rod stirring) | N/A |
| 5 | 5 | 0 | 0 | 30 (glass rod stirring) | N/A |
| 8 | 8 | 0 | 0 | 40 (glass rod stirring) | N/A |

TABLE 2

Dissolution and re-dissolution times (minutes) for various concentrations (wt %) of chitosan (MW 1017 kDa) with Aspartic Acid (Asp), Glutamic Acid (Glu), or Acetic Acid AA)

| Chitosan Percentage | Organic Acid Percentage (wt %) | | | Dissolution | Re-dissolution Time (min) for |
|---|---|---|---|---|---|
| (wt %) | Asp | Glu | AA | Time (min) | dried powder |
| 1 | 1 | 0 | 0 | 30 | 5 |
| 1 | 0.8 | 0 | 0 | >180 | N/A |
| 1 | 0.7 | 0 | 0 | Still had some particles | N/A |
| 1 | 0 | 1 | 0 | 40 | 15 |
| 1 | 0.4 | 0.25 | 0.25 | 35 | 8 |
| 1 | 0.5 | 0.25 | 0.25 | 30 | 5 |
| 4 | 4 | 0 | 0 | 30 (glass rod stirring) | N/A |
| 1 | 0 | 0 | 1 | >300 | Only partially re-dissolved |

Notes to Tables 1 and 2: N/A: Not available.

All measurements were carried out with 100 mL of solution.

All ratios are given on a mass (or weight) basis

Dissolving was aided with magnetic stirring unless otherwise indicated.

For 789 kDa chitosan at room temperature, the maximum concentration of chitosan in solution was ~8%.

For 1017 kDa chitosan at room temperature, the maximum concentration of chitosan in solution was ~4%.

Table 1 indicates that aspartic acid (Asp) was most effective in solubilizing 789 kDa chitosan. The maximum concentration of 789 kDa chitosan in solution was ~8%, a concentration that could not be achieved with acetic acid. At a chitosan:Asp mass ratio of 1:0.7, it took more than 3 hours for complete dissolution of 1% chitosan. When the chitosan:Asp mass ratio was below 1:0.7, chitosan dissolved only incompletely. However, a slight change in the chitosan:Asp ratio to 1:0.8 or 1:1 led to much faster dissolution times for 1% chitosan—30 and 20 min, respectively. The preferred chitosan:Asp mass ratio is 1:1, or about 1:1. The amount of Asp or Glu can be greater than the amount of chitosan, which could accelerate solubilization; however, for economic reasons it is usually preferred not to use substantially more of the amino acid than would be present in a 1:1 mass ratio with chitosan. Even at the preferred 1:1 ratio, increasing the chitosan and Asp concentrations to 3%, 5%, or 8% required longer dissolution times (25, 30, and 40 minutes, respectively, compared to 20 minutes at 1%). At concentrations of 3% and above, solutions of the 789 kDa chitosan were thick and gel-like.

Glutamic acid (Glu) can be used as an alternative to (or in addition to) Asp. The 789 kDa chitosan took longer to dissolve with Glu than with Asp (35 min v. 20 min.) at a chitosan:amino acid 1:1 mass ratio, and 1% chitosan. Combinations of Asp, Glu and acetic acid (AA) at ratios of 0.4:0.25:0.25 or 0.5:0.25:0.25 dissolved 1% chitosan in 30 or 25 min, respectively.

After drying in air, the chitosan:amino acid powders with higher Asp concentrations had shorter re-dissolution times, ranging from 5-15 min. By contrast, after the chitosan:acetic acid solution was dried, the resulting powder could only be partially re-dissolved in water.

Qualitatively similar results were seen with 1017 kDa chitosan. Because the molecular weight was significantly higher than 789 kDa, dissolution took substantially longer. It took over three hours to completely dissolve 1% chitosan when the Asp mass ratio (e.g., 0.8) was below the preferred chitosan:Asp mass ratio of 1:1. At an Asp mass ratio of 1:0.7 or less, 1% chitosan dissolved only incompletely. At the preferred 1:1 mass ratio, it was possible to prepare an aqueous solution containing up to ~4% 1017 kDa chitosan, a concentration that was not possible with acetic acid.

Examples 23-29: Measurements of Chitosan Molecular Weight Before and after Drying The molecular weight of chitosan (having an initial MW of 1017 kDa) after dissolution with various acids or combinations was determined before and after air drying or oven drying. Molecular weight was measured by gel permeation chromatography (GPC), with details as described in Table 3. Briefly, in gel permeation chromatography a polymer is introduced onto a column packed with beads having certain porosity and particle size. Larger molecules are less able to permeate the pores in the beads, and larger molecules therefore elute faster. A shorter retention time indicates a higher molecular weight.

All combinations tested in this set of experiments employed 1% chitosan (1017 kDa). The chitosan was dissolved with one of the following: (a) 1% AA with air drying (25° C.); (b) 1% Asp with air drying (25° C.); (c) 1% Asp with oven drying (80-90° C.); (d) 1% Glu with air drying (25° C.); (e) 1% Glu with oven drying (80-90° C.); (f) a mixture of 0.5% Asp, 0.25% Glu and 0.25% AA with air drying (25° C.); (g) a mixture of 0.5% Asp, 0.25% Glu and 0.25% AA with oven drying (80-90° C.). Because unmodified 1017 kDa chitosan is not water soluble, combination (a), the solution of 1017 kDa chitosan with 1% acetic acid, was used as the control.

The control had a retention time of 9.56 min in the gel permeation column. The other treatments all had retention times between 9.22 and 9.46 min, within 3.6% of the control. These observations suggested that the molecular weight of the 1017 kDa chitosan did not change substantially after dissolution by Asp, Glu, or acetic acid. These observations also showed that neither air drying (25° C.) nor oven drying (80-90° C.) had a substantial effect on the chitosan's molecular weight.

TABLE 3

Gel permeation chromatography.

| | |
|---|---|
| GPC Equipment | Shimadzu Class-VP V6.14 SP2 |
| Column | Shodex PLgel column |
| Detector | Refractive index detector |
| Mobile phase | Water |
| Flow rate | 1 mL/min |
| Temperature | 40° C. |
| Calibration | Pullulan standard |

Examples 30-47: Visual Observations of, and pH Values of Freshly-Prepared, Centrifuged, and Filtered Chitosan Solutions For both the 789 and 1017 kDa MW chitosans, a 1% solution was viscous, and a 3% or greater solution was gel-like. (See Tables 4 and 5). Some visible particles were observed in a 1% chitosan solution when 789 kDa chitosan was dissolved in 0.5% Asp, or when 1017 kDa chitosan was dissolved in 0.7% Asp. Other treatments yielded chitosan solutions that appeared to be homogeneous and viscous, with no precipitant visible following centrifugation. Vacuum filtration was used to evaluate the degree of solubilization; the less residue that could be collected by filtration, the higher the inferred degree of solubilization. Increasing the concentration of Asp or Glu decreased the amount of residue collected on filter paper. The pH values decreased with increased concentrations of Asp.

TABLE 4

Visual observations, pH values, and residue after filtration for chitosan (MW 789 kDa) in various mixtures

| Chitosan Concentration (%) | pH | Organic Acid concentration (%) | | | Visual observation | | Residue After Filtration and Drying (% by mass) |
|---|---|---|---|---|---|---|---|
| | | Asp | Glu | AA | Freshly Prepared | After Centrifuge | |
| 1 | 3.02 | 1 | 0 | 0 | Viscous solution | No precipitation | <0.2% |
| 1 | 3.16 | 0.8 | 0 | 0 | Viscous solution | No precipitation | <0.5% |
| 1 | 3.42 | 0.7 | 0 | 0 | Viscous solution | No precipitation | <2.0% |
| 1 | N/A | 0.5 | 0 | 0 | Some undissolved particles visible | N/A | N/A |
| 1 | 3.33 | 0 | 1 | 0 | Viscous solution | No precipitation | <0.2% |
| 1 | 3.40 | 0.4 | 0.25 | 0.25 | Viscous solution | No precipitation | <0.5% |
| 1 | 3.48 | 0.5 | 0.25 | 0.25 | Viscous solution | No precipitation | <0.2% |
| 3 | N/A | 3 | 0 | 0 | Gel | N/A | N/A |
| 5 | N/A | 5 | 0 | 0 | Gel | N/A | N/A |
| 8 | N/A | 8 | 0 | 0 | Gel | N/A | N/A |

TABLE 5

Visual observations, pH values, and residue after filtration for chitosan (MW 1017 kPa) in various mixtures

| Chitosan concentration (%) | pH | Organic Acid concentration (%) | | | Visual observation | | Residue After Filtration and Drying (% by mass) |
|---|---|---|---|---|---|---|---|
| | | Asp | Glu | AA | Freshly Prepared | After Centrifuge | |
| 1 | 3.06 | 1 | 0 | 0 | Viscous solution | No precipitation | <0.8% |
| 1 | 3.47 | 0.8 | 0 | 0 | Viscous solution | No precipitation | <2.0% |
| 1 | N/A | 0.7 | 0 | 0 | Some undissolved particles visible | No precipitation | N/A |
| 1 | 3.38 | 0 | 1 | 0 | Viscous solution | No precipitation | <1.0% |
| 1 | 3.35 | 0.4 | 0.25 | 0.25 | Viscous solution | No precipitation | <1.0% |
| 1 | 3.22 | 0.5 | 0.25 | 0.25 | Viscous solution | No precipitation | <0.8% |
| 3 | N/A | 3 | 0 | 0 | Gel | N/A | N/A |
| 4 | N/A | 4 | 0 | 0 | Gel | N/A | N/A |

Notes to Tables 4 and 5:
N/A: not applicable.
Asp = aspartic acid,
Glu = glutamic acid,
AA = acetic acid Notes to Tables 4 and 5: N/A: not applicable. Asp=aspartic acid, Glu=glutamic acid, AA=acetic acid Examples 48-58: Viscosity of Chitosan Solutions with Different Percentages of Asp or AA The viscosity of 1-8% chitosan solutions is shown in Table 6. Increasing the chitosan concentration increased the viscosity of the solution. At a given chitosan concentration, the higher MW chitosan solution was more viscous. The viscosity of a chitosan solution prepared with AA was higher than the viscosity of a solution prepared with Asp in most (but not all) cases. Contrary to a report in the literature that the viscosity of a solution of chitosan with an organic acid is positively correlated with the number of carbons in the organic acid, we found that aspartic acid, with more carbon atoms, produced a lower viscosity chitosan solution than did acetic acid, with fewer carbon atoms. Without wishing to be bound by this hypothesis, we propose that the two carboxyl groups of aspartic acid (or glutamic acid) enhance the solubility of the chitosan polymer more than does the single carboxyl group of acetic acid. Aspartic acid is more effective at dissolving high MW chitosan, and aspartic acid can dissolve higher concentrations of chitosan than acetic acid can.

TABLE 6

Viscosities of various chitosan solutions

| Sample | Viscosity (cP) | Spindle | Speed (rpm) |
|---|---|---|---|
| 1% chitosan (1017 kDa) & 1% Asp | 241 | T-F | 60 |
| 3% chitosan (1017 kDa) & 3% Asp | 7820 | T-F | 60 |
| 4% chitosan (1017 kDa) & 4% Asp | 14725 | T-F | 60 |
| 1% chitosan (1017 kDa) & 1% AA | 492 | T-F | 60 |
| 1% chitosan (789 kDa) & 1% Asp | 62 | T-F | 60 |
| 3% chitosan (789 kDa) & 3% Asp | 590 | T-F | 60 |
| 5% chitosan (789 kDa) & 5% Asp | 8925 | T-F | 60 |
| 8% chitosan (789 kDa) & 8% Asp | 20350 | T-F | 60 |
| 1% chitosan (789 kDa) & 1% AA | 66 | T-F | 60 |
| 3% chitosan (789 kDa) & 3% AA | 770 | T-F | 60 |
| 5% chitosan (789 kDa) & 5% AA | 10678 | T-F | 60 |

Notes to Table 6:
Asp = aspartic acid, AA = acetic acid.

Examples 59-67: Dissolving and Re-Dissolving Chitosan with Various Organic Acids Various organic acids including acetic, ascorbic, malic, and citric acids were tested for their ability to dissolve high molecular weight (HMW) chitosan (789 kDa or 1017 kDa) in deionized water. The resulting solutions were dried, and the ability of the dried powder to re-dissolve in deionized water was also tested.

We observed:
1. It took more than 5 hours for acetic acid (1%) to dissolve HMW chitosan (1%). After the acetic acid/chitosan solution had been dried, the resulting powder could only be partially re-dissolved.
2. Ascorbic acid (1%) could dissolve 789 kDa chitosan (1%) within 2 hours, and 1017 kDa chitosan within three hours. In both cases, after drying the resulting powder could be re-dissolved within one hour. However, the resulting chitosan solution gradually turned brown with visible precipitates after two days of storage at room temperature, presumably due to oxidation of ascorbic acid. Such oxidation presumably affects the solubility of chitosan and other chemical properties of the chitosan solution, although we have not yet quantitatively tested those effects. Ascorbic acid is therefore not a practical reagent for producing water-soluble HMW chitosan powders. By contrast, there were no observed changes in physical properties (e.g., color) when chitosan/aspartic acid or chitosan/glutamic acid was re-dissolved in water and allowed to stand for five days at room temperature. Even so, the shelf life of the novel powder will be longer than the shelf life of a solution, so it will usually be preferred to store the composition as a powder until it is ready for use.
3. When chitosan was mixed with a malic acid solution or a citric acid solution under constant stirring for over 24 hours, followed by filtration, drying, and weighing, about 10% (for malic acid) and over 80% (for citric acid) of the chitosan remained as undissolved solid particles. In other words, malic acid and citric acid were both poor solubilizers of chitosan.
4. None of the organic acids we tested, other than aspartic acid and glutamic acid, were effective and practical for dissolving and re-dissolving high molecular weight chitosans. Each of the other organic acids tested had one or more drawbacks: viz., the acids were poor solubilizers of HMW chitosan, or the dried powder could not be fully redissolved, or oxidation products appeared when a solution was allowed to stand. Of the organic acids tested, only aspartic acid and glutamic acid overcame all these problems.

Comparison to Huanbutta et al. and to Orienti et al.

Table 7 below compares experimental observations made with our novel compositions to results previously reported by Orienti et al. (2002) or Huanbutta et al. (2013), which represent the closest prior work known to the inventors. The entries in Table 7 corresponding to Orienti et al. (2002) and Huanbutta et al. (2013) reflect what was reported in the respective papers; the present inventors have made no attempts to replicate those experiments. The entries in Table 7 for the "Present Invention" reflect actual experimental observations made by the present inventors. Table 7 shows that the novel compositions possess significant advantages over the earlier compositions.

| Drying Method; citation | Spray Drying (Orienti et al. 2002) | Spray Drying (Huanbutta et al., 2013) | Oven Drying (Present Invention) | Room Temperature Air Drying (Present Invention) |
|---|---|---|---|---|
| Molecular weight of chitosan | 600 kDa | 45 kDa or 200 kDa | 789 kDa or 1017 kDa | 789 kDa or 1017 kDa |
| Was chitosan found to be soluble in amino acid solution? | soluble | soluble | soluble | soluble |

-continued

| Drying Method; citation | Spray Drying (Orienti et al. 2002) | Spray Drying (Huanbutta et al., 2013) | Oven Drying (Present Invention) | Room Temperature Air Drying (Present Invention) |
|---|---|---|---|---|
| Ratio of chitosan:amino acid in the solution | 1:1 or 1:2 (molar ratio, based on monomer) | not expressly stated (possibly 3.5% w/w in aqueous solution, based on a reference to Nunthanid et al., 2009, but this is not clear) | 1:1 (mass ratio) | 1:1 (mass ratio) |
| Temperature for drying chitosan/amino acid mixture (chitosan salt) | Inlet: 105° C. | Inlet: 140° C. Outlet: 80-90° C. | 80-90° C. | 25° C. |
| Re-dissolving concentration of chitosan salt in aqueous solution | 20 mg/10 mL | not stated | 20 mg/10 mL or 200 mg/10 mL (ten times higher) | 20 mg/10 m or 200 mg/10 mL (ten times higher) |
| Did the dried chitosan salt re-dissolve in acidic buffer (pH 2)? | Swelled after 24-48 h; did not expressly state whether the composition was soluble, only that it swelled | Swelled (200 kDa) after 120 min; did not expressly state whether the composition was soluble, only that it swelled | Soluble within 15 min | Soluble within 15 min |
| Did the dried chitosan salt re-dissolve in water (pH 7)? | not reported | not reported | Soluble within 15 min | Soluble within 15 min |
| Did the dried chitosan salt re-dissolve in Tris-HCl buffer? (pH 6.8-7) | not soluble; did not swell | Less swelling at pH 6.8 compared to pH 1.2; did not expressly state whether soluble | For 789 kDa (a) Soluble at 200 mg/10 mL after 1 h (pH of the buffer changed to 6.2 in the process) (b) Soluble at 20 mg/10 mL after 1 h (pH of the buffer changed to 6.7 in the process) For 1017 kDa (a) First swelled and then dissolved (soluble) at 200 mg/10 mL after 1 h (pH of the buffer changed to 6.7 in the process) (b) First swelled and then dissolved (soluble) at 20 mg/10 mL after 1 h (pH of the buffer changed to 6.7 in the process) | For 789 kDa (a) Soluble at 200 mg/10 mL after 1 h (pH of the buffer changed to 6.2 in the process) (b) Soluble at 20 mg/10 mL after 1 h (pH of the buffer changed to 6.7 in the process) For 1017 kDa (a) First swelled and then dissolved (soluble) at 200 mg/10 mL after 1 h (pH of the buffer changed to 6.7 in the process) (b) First swelled and then dissolved (soluble) at 20 mg/10 mL after 1 h (pH of the buffer changed to 6.7 in the process) |
| Stirred when re-dissolving? | no | no | yes | Yes |

The composition of the present invention is soluble in both acidic and neutral aqueous solutions; and it is evidently soluble at much higher concentrations than has previously been reported in the literature.

Without wishing to be bound by this hypothesis, one possibility is that the drying method used may have a surprisingly important effect on the solubility of the chitosan salt compositions. We used a lower drying temperature than did Orienti et al. (2002) or Huanbutta et al. (2013). We used moderate-temperature oven drying or room-temperature air drying, while the cited references used spray drying. Although the solutions were exposed to high temperatures for a relatively short time during the spray drying, the surface area exposed to the heat stream during spray-drying is relatively high. The high surface area during exposure to high temperature may promote thermal decomposition, and thus affect a polymer's physicochemical properties, such as the distribution of electrostatic charges, and thus affect its solubility.

Stirring may also affect solubility properties. Our "re-dissolving" mixtures were always stirred, while those of Orienti et al. (2002) and Huanbutta et al. (2013) were evidently not stirred. Note: We have not attempted to replicate the experiments of Orienti et al. (2002) or Huanbutta et al. (2013), either with or without stirring; nor have we carried out "re-dissolving" experiments on our compositions without stirring.

Definitions

The term "solid-state salt" of a chitosan and an acidic amino acid should not be given an overly technical interpretation. Rather, as used in the specification and claims, the term "solid-state salt" of a chitosan and an acidic amino acid (particularly, aspartic acid, glutamic acid, or both) refers to a composition having the following properties: (a) The composition is in the solid state. (b) The composition contains both chitosan and an acidic amino acid, which have at least partially reacted with one another. (c) At least some of the amino groups of the chitosan are protonated. It is not necessary for all amino groups of the chitosan to be protonated. (d) At least some of the carboxyl groups of the acidic amino acid are deprotonated. It is not necessary for all carboxyl groups of the acidic amino acid to be deprotonated. (e) Water molecules may optionally be present in the composition. E.g., waters of hydration may optionally be present. Provided that the composition is in the solid state, the possible presence of water molecules does not remove the composition from the definition of a "solid-state salt." (g) The amino groups of the chitosan and the carboxyl groups of the acidic amino acid may or may not be in a stoichiometric ratio with one another. An excess of either is permissible, as is a stoichiometric ratio. Also, unless context clearly indicates otherwise, the term "chitosan powder" has the same meaning as "solid-state salt" of a chitosan and an acidic amino acid" as defined above.

As used herein, the term "essentially free of" is the converse of the well-known term "consisting essentially of." Just as the transitional phrase "consisting essentially of" limits the scope of an invention to the specified materials or steps "and those that do not materially affect the basic and novel characteristic(s)" of the invention, the transitional phrase "essentially free of" means that the excluded component(s) either are absent from the composition, or if present they are present in such low concentration(s) that they do not materially affect the basic and novel characteristics of the invention as compared to the characteristics of an otherwise identical composition in which the excluded component(s) are entirely absent.

As used herein, the term "mineral acid" means an inorganic compound that releases hydrogen ions when dissolved in water, particularly strong inorganic acids such as sulfuric acid, hydrochloric acid, and nitric acid. By contrast, an acidic compound containing a carboxylic acid group (—COOH) is considered an organic acid, and is not considered a "mineral acid." Thus, by way of example, amino acids such as glutamic acid and aspartic acid are not considered "mineral acids." By way of further example, the following would be considered "mineral acids":phosphoric acid, perchloric acid, hydrofluoric acid, and sulfurous acid.

As used herein, a "surfactant" is an amphiphilic compound containing both hydrophobic groups and hydrophilic groups that can help to disperse otherwise insoluble hydrophobic compounds and hydrophilic compounds with one another, typically by forming micelles. Examples of surfactants include polysorbate 80, sodium stearate, and sodium dodecylbenzenesulfonate. Examples of compounds that are not considered "surfactants" include chitin, chitosan, and amino acids such as aspartic acid and glutamic acid As used herein, a "plasticizer" is a substance incorporated into a polymer that improves the polymer's flexibility, workability and processability, and decreases brittleness and shrinking during handling and storage. A plasticizer reduces the tension of deformation, hardness, density, viscosity and electrostatic charge of the polymer, while increasing the polymer chain's flexibility, resistance to fracture and dielectric constant. In addition to water, commonly used plasticizers include polyols (e.g., glycerol, ethylene glycol, diethylene glycol, triethylene glycol, tetraethylene glycol and polyethylene glycol, propylene glycol), sorbitol, mannitol, xylitol, fatty acids, mono-, di- and oligo-saccharides (glucose, mannose, fructose, sucrose), ethanolamine, triethanolamine, vegetable oils, lecithin, and waxes. Compositions of the present invention can optionally include a plasticizer, but in preferred embodiments no plasticizer is used.

As used herein, to "completely dissolve" a solid material, particularly to "completely dissolve" a solid-state salt of a chitosan and an acidic amino acid in water, means that no undissolved solid residue remains at all; or that any undissolved solid residue that remains is less than two percent (<2.0%) of the original solid material by mass, preferably less than one percent (<1.0%), more preferably less than four-fifths of one percent (<0.8%), more preferably less than one-half percent (<0.5%), and more preferably less than one-fifth of one percent (<0.2%)

The complete disclosures of all references cited in this specification are hereby incorporated by reference, as is the complete disclosure of priority application 62/255,697. In the event of an otherwise irreconcilable conflict, however, the present specification shall control.

What is claimed:
1. A solid-state salt of a chitosan and an acidic amino acid; wherein:
   (a) said chitosan has an average molecular weight at least 70 kDa;
   (b) said acidic amino acid comprises aspartic acid, glutamic acid, or both;
   (c) the mass of said acidic amino acid is at least 0.7 times the mass of said chitosan; and
   (d) said salt is a solid-state salt, that has the ability to completely dissolve in water at 25° C. to yield an aqueous solution comprising at least 1% chitosan by mass;
   wherein:
   (e) said solid-state salt is essentially free of mineral acid;
   (f) wherein said solid-state salt is essentially free of acetic acid, and said solid-state salt is essentially free of acetate salts;
   (g) said solid-state salt is essentially free of surfactant; and
   (h) said solid-state salt is not a coating on an agricultural product.

2. The solid-state salt of claim 1, wherein said salt has the ability to dissolve in a Tris-HCI aqueous buffer solution having an initial pH of 6.8-7.0 at a rate at least twice as fast, under otherwise comparable conditions, as the rate at which unmodified chitosan dissolves in a Tris-HCI aqueous buffer solution having an initial pH of 6.8-7.0 and containing the same acidic amino acid in the form of a free amino acid, to reach the same final concentrations of the dissolved chitosan and the dissolved free acidic amino acid.

3. The solid-state salt of claim 1, wherein said chitosan has an average molecular weight at least 100 kDa.

4. The solid-state salt of claim 1, wherein said chitosan has an average molecular weight at least 300 kDa.

5. The solid-state salt of claim 1, wherein said chitosan has an average molecular weight at least 700 kDa.

6. The solid-state salt of claim 1, wherein said chitosan has an average molecular weight at least 1000 kDa.

7. The solid-state salt of claim 1, wherein said acidic amino acid consists essentially of aspartic acid, glutamic acid, or both.

8. The solid-state salt of claim 1, wherein the mass of said acidic amino acid is at least 0.8 times the mass of said chitosan.

9. The solid-state salt of claim 1, wherein the mass of said acidic amino acid is at least 1.0 times the mass of said chitosan.

10. The solid-state salt of claim 1, wherein said solid-state salt has the ability to dissolve in water at 25° C. to yield a solution comprising at least 4% chitosan by mass.

11. The solid-state salt of claim 1, wherein said solid-state salt has the ability to dissolve in water at 25° C. to yield a solution comprising at least 5% chitosan by mass.

12. The solid-state salt of claim 1, wherein said solid-state salt has the ability to dissolve in water at 25° C. to yield a solution comprising at least 6% chitosan by mass.

13. The solid-state salt of claim 1, wherein said solid-state salt has the ability to dissolve in water at 25° C. to yield a solution comprising at least 7% chitosan by mass.

14. The solid-state salt of claim 1, wherein said solid-state salt has the ability to dissolve in water at 25° C. to yield a solution comprising at least 8% chitosan by mass.

15. The solid-state salt of claim 1, wherein said solid-state salt has the ability to form a gel upon dissolving in water.

16. The solid-state salt of claim 1, wherein said solid-state salt is essentially free of salts of mineral acids.

17. The solid-state salt of claim 1, wherein said solid-state salt is essentially free of plasticizer.

18. A process for making an aqueous chitosan solution, said process comprising dissolving the solid-state salt of claim 1 in water.

19. The process of claim 18, wherein the water is essentially free of acetic acid, essentially free of acetate salts, essentially free of mineral acids, and essentially free of salts of mineral acids.

\* \* \* \* \*